United States Patent [19]

Inoue

[11] Patent Number: 4,608,143
[45] Date of Patent: Aug. 26, 1986

[54] TW-ELECTROEROSION APPARATUS WITH WHEELED DRIVE CARRIAGES

[75] Inventor: Kiyoshi Inoue, Tokyo, Japan

[73] Assignee: Inoue-Japax Research Incorporated, Yokohamashi, Japan

[21] Appl. No.: 661,713

[22] Filed: Oct. 17, 1984

[30] Foreign Application Priority Data

Oct. 18, 1983 [JP] Japan ............................... 58-193337
Nov. 9, 1983 [JP] Japan ............................... 58-209209

[51] Int. Cl.$^4$ ........................ B23H 7/10; B23H 7/26; B23K 7/16
[52] U.S. Cl. .............................. 204/224 M; 204/225; 219/69 W
[58] Field of Search .................. 204/224 M, 225, 206; 219/69 W, 69 R, 69 E

[56] References Cited

U.S. PATENT DOCUMENTS

| 2,974,216 | 3/1961 | Inoue | 219/69 W |
| 4,205,212 | 5/1980 | Ullmann et al. | 219/69 W |
| 4,301,349 | 11/1981 | Inoue | 219/69 W |
| 4,492,841 | 1/1985 | Delius | 219/69 R |

FOREIGN PATENT DOCUMENTS 3208816 10/1982 Fed. Rep. of Germany .
3319935 12/1983 Fed. Rep. of Germany .
0707744 1/1980 U.S.S.R. ........................... 219/69 W Primary Examiner—Donald R. Valentine
Attorney, Agent, or Firm—Finnegan, Henderson, Farabow, Garrett & Dunner

[57] ABSTRACT

A traveling-electrode electroerosion apparatus using a pair of wheeled carriages which accommodate axial electrode drives and machining feed drives. The wheeled carriages also carry a pair of guide members for establishing a straight-line path for the electrode to travel through the workpiece. The axial drives used to maintain the electrode in traveling alignment with the straight-line path serve in this improvement to generate a tension force acting on the traveling electrode to force one of the wheeled carriages against one of two parallel surfaces and the other of the wheeled carriages to the other of the surfaces, thereby intensifying their respective frictional engagement with these surfaces, e.g. the upper and lower surfaces of the workpiece which may be massive. The machining feed drives are accommodated in the wheeled carriages and may be driven to enable these carriages in intensified frictional engagement with the surfaces to accurately and stably roll over them, so as to allow the straight-line path to move, leaving a programmed movement trajectory, relative to the workpiece to advance electroerosion along the trajectory in the workpiece.

4 Claims, 2 Drawing Figures

TW-ELECTROEROSION APPARATUS WITH WHEELED DRIVE CARRIAGES

FIELD OF THE INVENTION

The present invention relates to traveling-electrode (TE) electroerosion and, more particularly, to an apparatus for electroerosively machining a conductive workpiece by means of a continuous elongate electrode axially traveling continuously through the workpiece from one side thereof to the other side thereof.

BACKGROUND OF THE INVENTION

The term "electroerosion" is used herein to refers to a machining process in which electric energy is supplied across a machining gap formed between a tool electrode and a conductive workpiece and flushed with a machining fluid to remove material from the workpiece by the action of successive time-spaced electrical discharges effected across the gap (electrical discharge maching or EDM), the action of electrochemical or electrolytic solubilization (electrochemical machining or ECM) or a combination of these actions (electrochemical-discharge machining or ECDM). In EDM, the machining fluid is commonly a liquid which is basically electrically nonconductive or of dielectric nature and typically constituted by deionized water, a liquid hydrocarbon or a combination of such water and hydrocarbon. The electric energy is supplied commonly in the form of a succession of voltage pulses which result in a corresponding succession of pulsed, discrete electrical discharges across the machining gap. In ECM, the machining fluid is commonly a liquid electrolyte which is naturally conductive, and the machining current may be a direct current but is preferably in the form of pulses or pulsating current. In ECDM, the machining fluid is typically a liquid having both dielectric and electrolytic natures and may be tap water or water deionized to retain weak conductivity.

In traveling-electrode (TE) electroerosion, the tool electrode is constituted by a continuous electrode element which is typically a conductive wire having a diameter ranging from 0.05 mm to 0.5 mm, but may take the form of a tape or ribbon of similar thickness. Such electrode is broadly and generally referred to herein as a continuous electroeroding electrode. The electrode is axially transported continuously from a supply reel to a takeup reel through a machining zone in which a workpiece is disposed. The machining zone is commonly defined by a pair of machining guide members which support the traveling electrode and establish a straight-line electrode path across the workpiece. Electrode traction and braking units allow the continuous electrode to be tightly stretched and kept taut between the supply and the takeup and to be axially driven between the machining guide members while traversing the workpiece from one side thereof to the other side thereof along the straight-line path, thus presenting the continuously renewed electrode surface juxtaposed in an electroerosive cutting relationship with the workpiece across a narrow machining gap. The machining gap is flushed with a machining liquid medium and electrically energized with a high-density electrical machining current which is passed between the electrode and the workpiece to electroerosively remove material from the latter. The roles of the machining liquid medium in the electroerosive process are to carry the erosive machining current, to carry away the machining chips and other gap products, and to cool the traveling, thin continuous electrode and the workpiece.

In the conventional TE-electroerosion machine design, the electrode supply and takeup reels are mounted on the machine frame and so are the traction and braking units constituting an electrode feed means and are also the electrode guide members. The machine frame commonly includes a pair of arms having their ends between which the workpiece is disposed. These end portions are arranged to support the guide members which define thereacross the afore-mentioned straight-line electrode path traversing the workpiece. The traction and braking units and the supply and takeup reels are securely mounted on these arms and/or a base portion from which they extend in the machine frame which is, of course, secured in position. The workpiece is securely mounted on a worktable of compound cross-feed configuration which is displaced in a horizontal plane relative to the straight-line path transversely to advance electroerosion in the workpiece along a programmed machining path.

With the machine design described, it has been found that problems arise where a massive workpiece is to be machined. Thus, not only must the compound worktable have strokes of displacement which are unpractically long to cover a large displacement area, but the erosive machining action tends to become unstable or inaccurate. As the workpiece thickness is increased, there results a corresponding increase in the machining pressure which tends to deflect the traveling electrode backwards along the machining path, thus causing it to deviate from the established straight-line guide path. The increasing machining pressure can be countered by increasing the tension or the forward and/or backward tractions applied through the electrode feed means to the traveling electrode. It has been found, however, that this also brings about an increase in the unfavorable load on the arms supporting the guide means to the extent that the arms deflect to cause a serious guide-positioning and hence machining error.

OBJECTS OF THE INVENTION

It is, accordingly, an important object of the present invention to provide an improved traveling-electrode machining apparatus which is particularly suitable in machining massive workpieces.

Another important object of the invention is to provide an improved traveling-electrode machining apparatus which is especially suitable but not exclusively in machining massive workpiece and in which the axial tractions imposed on the traveling electrode are employed effectively and in a novel manner to increase the accuracy of electroerosive machining in the workpiece.

SUMMARY OF THE INVENTION

In accordance with the present invention there is provided an apparatus for machining a conductive workpiece by means of a continuous electroeroding electrode axially traveling continuously through the workpiece from one side thereof to the other side thereof, which apparatus comprises: a first wheeled carriage disposed at the said one side and carrying a storage of the continuous electrode to be gradually dispensed, the first carriage having a set of wheels in frictional engagement with a first surface disposed in the said one side; a second wheeled carriage disposed at the said other side and carrying a means for collecting the electrode traveling from the workpiece, the second carriage having a set of wheels in frictional engagement with a second surface disposed in the said other side; a first and a second electrode guide means mounted on the first and the second wheeled carriage, respectively, for establishing therebetween a straight-line electrode path across the workpiece; electrode feed means including a forward traction means mounted on the second wheeled carriage for advancing the electrode dispensed from the said storage, axially along the said straight-line path towards the collecting means and a backward traction means mounted on the first wheeled carriage for applying a braking traction to the advancing electrode to maintain it traveling forwards in alignment with the said path while generating a tension force in the traveling electrode, acting on the wheels of the first and second carriages to force them against the said first and second surfaces, respectively, thereby intensifying their respective frictional engagement therewith; and machining feed means including a first and a second drive means mounted on the first and second carriages, respectively, for rotationally driving their respective sets of wheels in intensified frictional engagement with the said surfaces to that said first and second carriages accurately roll over the said first and second surfaces, respectively, so as to allow the straight-line path to move, leaving a programmed movement trajectory, relative to the workpiece to advance electroerosion along the said trajectory in the workpiece.

In one embodiment of the invention, the said first and second surfaces may be constituted by two opposite surfaces of the workpiece, respectively.

BRIEF DESCRIPTION OF THE DRAWINGS

The present invention will be better understood from the detailed description given hereinbelow and the accompanying drawings which are given by way of illustration only, and thus are not limitative of the present invention and in which.

SPECIFIC DESCRIPTION

Figure 1:
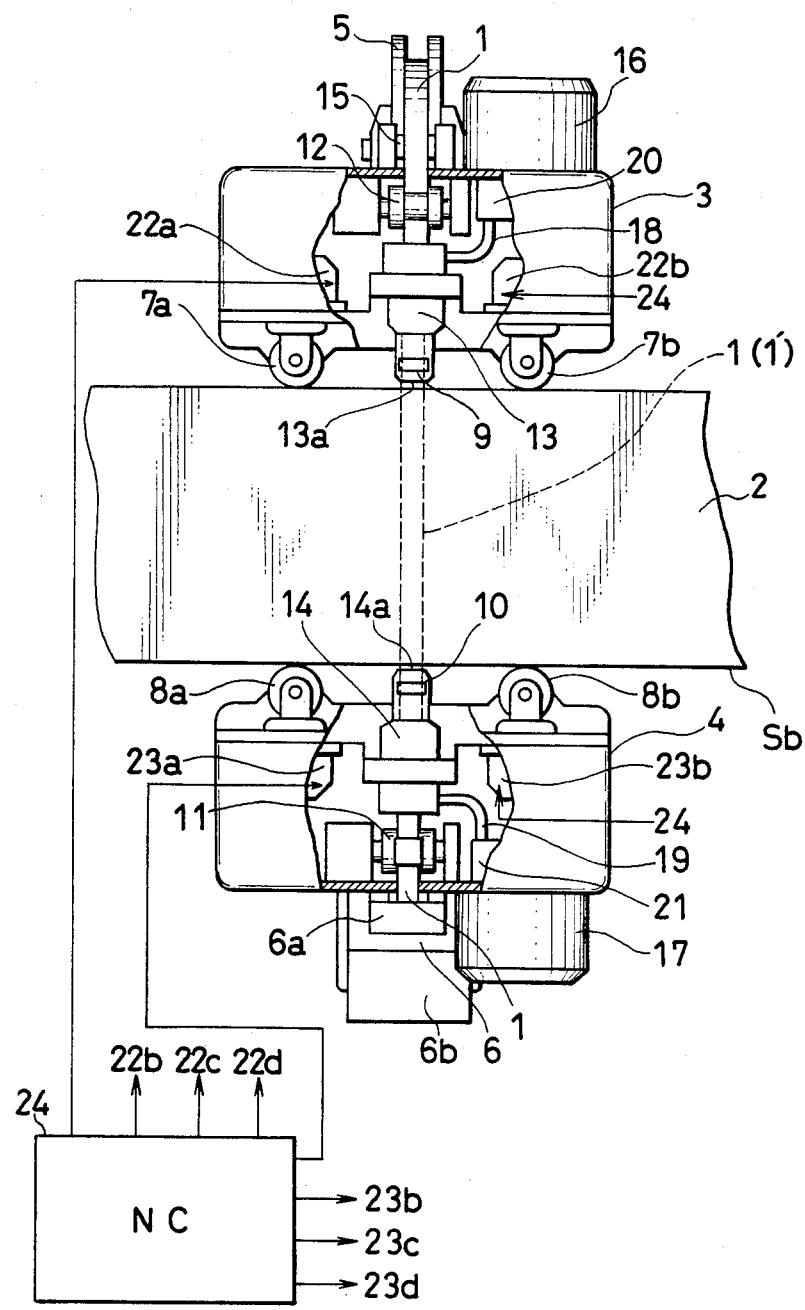
FIG. 1 is a front view partly fragmented, diagrammatically illustrating an illustrative embodiment of the present invention.
Figure 2:
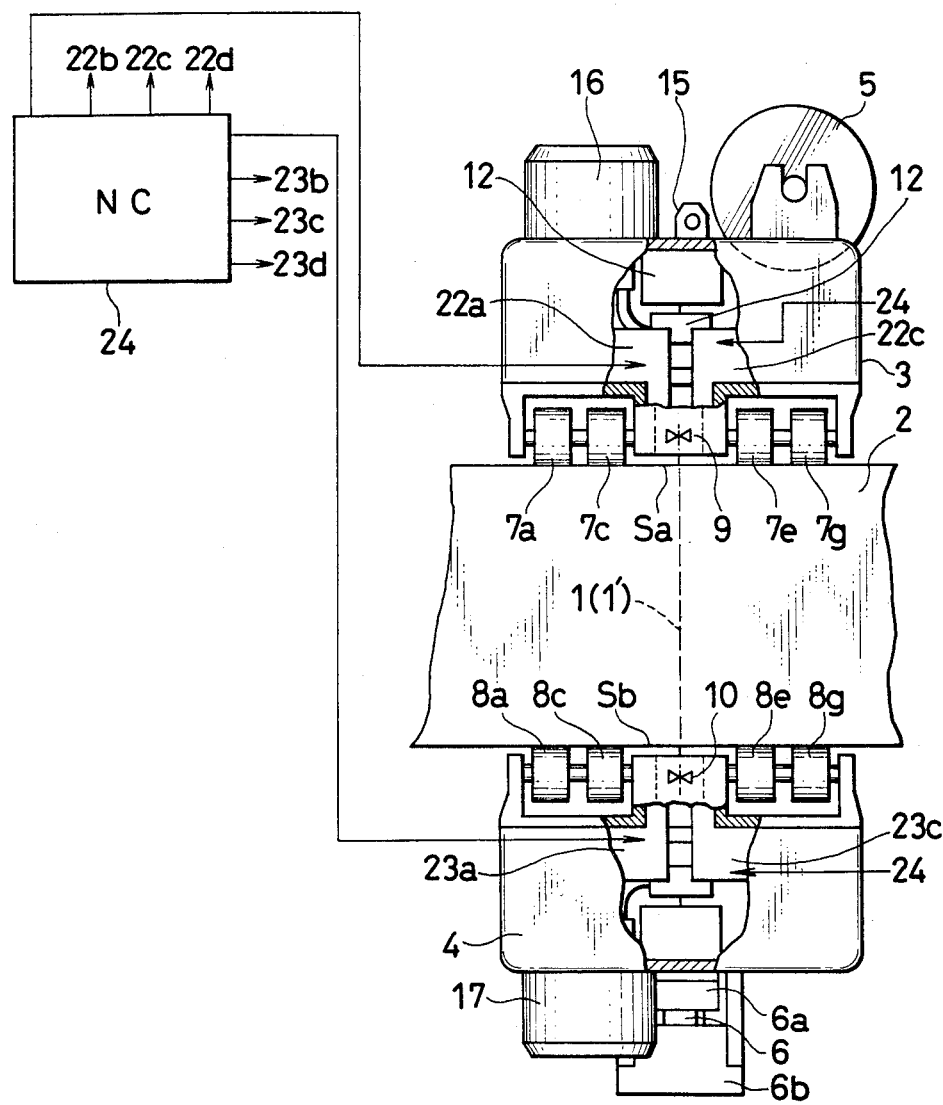
FIG. 2 is a side view partly fragmented, of the embodiment of FIG. 1.

Referring now to FIGS. 1 and 2, a continuous electroeroding electrode 1 is shown to be constituted in the form of a tape and to vertically traverse a massive workpiece 2 from up to down. The electrode can alternatively be in the form of a wire or ribbon. The workpiece 2 is securely mounted on a workpiece carriage (not shown) which may be either stationary or movable with one or two degrees of freedom. A first wheeled carriage 3 is disposed in the upper side of the workpiece 2 and a second wheeled carriage 4 is disposed in the lower sides of the workpiece 2. The upper carriage 3 carries a reel 5 storing the continuous tape electrode 1 to be gradually dispensed. The lower carriage 4 carries a tape collecting unit 6 comprising a cutter 6a for cutting the continuous tape 1 into pieces and a box 6b for receiving these pieces. The upper carriage 3 has a set of wheels 7a, 7b, 7c, 7d in one (e.g. left) side and 7e, 7f, 7g, 7h in the other (e.g. right) side, of which only 7a and 7b are shown in FIG. 1 and only 7a, 7c, 7e and 7g are shown in FIG. 2. These wheels are here arranged in frictional engagement with the upper surface Sa of the workpiece 2 in the embodiment illustrated. The lower carriage 4 has a like set of wheels 8a, 8b, 8c, 8d in one (e.g. left) side and 8e, 8f, 8g, 8h in the other (e.g. right) side, of which only 8a and 8b are shown in FIG. 1 and only 8a, 8c, 8e and 8g are shown in FIG. 2. These wheels are arranged in frictional engagement with the lower surface Sb of the workpiece 2 in the embodiment illustrated.

The first wheeled carriage 3 has mounted thereon an upper electrode guide member 9 for guiding the tape electrode 1 dispensed from the supply reel 5 into the workpiece 2 and the second wheeled carriage 4 has mounted thereon a lower electrode guide member 10 for guiding the tape electrode 1 passing out of the workpiece 2 towards the collecting unit 6. The upper and lower guide members 9 and 10 are provided to establish therebetween a straight-line path, indicated by parenthesized numerical 1', for the electrode 1 to travel through the workpiece 2.

The second wheeled carriage 4 has also mounted thereon a forward electrode traction unit 11 for advancing the tape electrode 1 axially along the straight-line path 1' through the workpiece 2 towards the collecting unit 6. The traction unit 11 can be a capstan and pinch roller device of conventional design for tape transport. As the tape electrode 1 is advanced through the workpiece 2, a storage portion of the electrode is gradually dispensed from the supply reel 5.

The first wheeled carriage 3 has also mounted thereon a backward electrode traction unit 12 for applying a braking traction to the advancing electrode 1 to tightly stretch it, thereby maintaining it traveling forwards in alignment with the path 1'. As a result, there develops in the electrode 1 traveling through the workpiece 2, a high tension force acting on the wheels 7a–7h of the upper carriage 3 and the wheels 8a–8h of the lower carriage to force the former wheels against the upper surface Sa of the workpiece 2 and the latter wheels against the lower surface Sb of the workpiece 2. The respective frictional engagement of the first and second wheeled carriages 3 and 4 with these rigid supporting surfaces Sa and Sb is thus advantageously intensified. The backward traction unit 12 can be constituted by a pair of abutting braking rollers of conventional design. A guide roller 15 is provided between the storage reel 5 and the braking unit 12.

Fluid delivery assemblies 13 and 14 are also mounted on the upper and lower wheeled carriages 3 and 4, respectively. Each assembly 13, 14 here comprises a hollow member longitudinally traversed by the tape electrode 1 and having an internal passage ending with a nozzle opening 13a, 14a for discharging a machining liquid medium towards the workpiece 1. As shown, the nozzle openings 13a and 14a are juxtaposed across a small spacing with the upper and lower workpiece surface Sa and Sb, respectively. The internal passages of the nozzle assemblies 13 and 14 have their respective fluid inlets communicating via respective conduits 18 and 19, with tanks 16 and 17, respectively, which store the machining liquid medium supplied from an external source (not shown). The conduit 18, 19 includes a pump 20, 21 which is actuated to draw the machining liquid medium from the tank 16, 17 into the internal fluid passage of the nozzle assembly 13, 14 so that the liquid medium is discharged through the outlet opening 13a, 14a forming an envelop flow surrounding the traveling tape electrode 1 and flowing into the machining zone in the workpiece 1. Although the tanks 16, 17 and the pumps 20, 21 are shown as mounted on the carriages 3, 4, this is not essential and they may be relocated on some external place. The electrode guide members 9 and 10 are securely held within the internal passages of the upper and lower nozzle assemblies 13 and 14, respectively.

A machining feed means for effecting a machining displacement of the electrode 1 relative to the workpiece 2 includes a first set of drive units 22a, 22b, 22c and 22d mounted on the upper wheeled carriage 3 and a second set of drive units 23a, 23b, 23c and 23d mounted on the lower wheeled carriage 4. The drive units 22a–22d are arranged to rotationally drive the wheels 7a and 7c, 7b and 7d, 7e and 7g and 7f and 7h, respectively, of the first carriage 3. The drive units 23a–23d are arranged to rotationally drive the wheels 8a and 8c, 8b and 8d, 8e and 8g and 8f and 8h, respectively, of the second carriage 4. The drive units 22a–23d can each be a stepping motor or a DC motor with an encoder and are controllably driven by drive commands furnished with a numerical control (NC) unit 24 to enable the straight-line path 1' to move, leaving a programmed movement trajectory, relative to the workpiece 2 to advance electroerosion by the travelling electrode along the trajectory in the workpiece 2. Thus, the drive units 22a–22d of the upper carriage 3 are driven by respective streams of drive commands of the NC unit 24 to move the upper guide member 9 along a first prescribed path while the drive units 23a–23d of the lower carriage 4 are driven by respective stream of drive commands of the NC unit 24 to move the lower guide member 10 along a second prescribed path. For example, the first and second prescribed path can be equal to each other so that a predetermined straight-line cut is produced in the workpiece 2. However, any two- or three-dimensional erosion contour can be produced by virtue of the fact that the two guide members 9 and 19 can be moved independently from each other and are movable in response to two independent sets of four streams of drive commands which can be programmed in the NC unit 24 according to the desired erosion contour. Furthermore, since the wheeled carriages 3 and 4 while rolling over the surfaces Sa and Sb are held in intensified frictional engagement therewith, a highly accurate and stabilized rolling movement of each carriage is achieved.

Preferably, one or both of the wheeled carriages 3 and 4 is constructed to be magnetically attractable to the surfaces Sa, Sb. This modification is particularly desirable to prevent the carriage 3, 4 from departing from its engaging surface Sa, Sb where an accidental breakage of the tape electrode 1 may occur during a machining operation. To this end, for example, the wheels 7a–7h and 8a–8h may be composed of a permanent magnet material so that they may remain magnetically attracted to the workpiece 2 which is magnetically permeable as typically is. Alternatively, an electromagnet may be providfed within one or each of the carriages 3, 4 so that is may be actuated immediately upon occurrence of a breakage of the tape electrode 1 traveling through the workpiece 2 to establish closed magnetic circuits passing through each or selected ones of the wheels and the workpiece 2. An appropriate sensing circuit is provided which responds to the electrode breakage to produce an actuating signal which is applied to an energization circuit of the electromagnets to establish the closed magnetic circuits, thereby magnetically attracting the carriages 3, 4 to the workpiece 2.

What is claimed is:

1. An apparatus for machining a conductive workpiece by means of a continuous electroeroding electrode axially traveling continuously through the workpiece from one side thereof to the other side thereof, the apparatus comprising:
    a first wheeled carriage disposed at said one side and carrying a storage of said continuous electrode to be gradually dispensed, the first carriage having a set of wheels in frictional engagement with a first surface disposed in said one side;
    a second wheeled carriage disposed at said other side and carrying a means for collecting the electrode traveling from the workpiece, the second carriage having a set of wheels in frictional engagement with a second surface disposed in said other side;
    a frist and a second electrode guide means mounted on said first and said second wheeled carriage, respectively, for establishing therebetween a straight-line electrode path across the workpiece;
    electrode feed means including a forward traction means mounted on said second wheeled carriage for advancing the electrode dispensed from said storage, axially along said straight-line path towards said collecting means and a backward traction means mounted on said first wheeled carriage for applying a braking traction to the advancing electrode to maintain it traveling forwards in alignment with said path while generating a tension force in the traveling electrode, acting on said wheels of the first and second carriages to force them against said first and second surfaces, respectively, thereby intensifying their respective frictional engagement therewith; and
    machining feed means including a first and a second drive means mounted on said first and second carriages, respectively, for rotationally driving their respective sets of wheels in intensified frictional engagement with said surfaces so that said first and second carriages accurately roll over said first and second surfaces, respectively, so as to allow said straight-line path to move, leaving a programmed movement trajectory, relative to the workpiece to advance electroerosion along said trajectory in the workpiece.

2. The apparatus defined in claim 1 wherein said first and second surfaces are constituted by two opposite surfaces of the workpiece, respectively.

3. In an apparatus for machining a conductive workpiece by means of a continuous electroeroding electrode axially traveling continuously through the workpiece from one side thereof to the other side thereof, the apparatus including
    means for storing and gradually dispensing said continuous electrode from said one side towards the workpiece,
    means on said other side for collecting the electrode traveling from the workpiece,
    first and second guide means for establishing therebetween a straight-line electrode path across the workpiece, and
    electrode feed means including a forward traction means for advancing the electrode dispensed from said storing means axially along said straight-line path towards said collecting means and a backward traction means for applying a braking traction to the advancing electrode to maintain it traveling forwards in alignment with said path, the improvement comprising:

a first wheeled carriage disposed at said one side carrying said storing means and having a set of wheels in frictional engagement with a first surface disposed on said one side;

a second wheeled carriage disposed on said other side carrying said collecting means and having a set of wheels in frictional engagement with a second surface disposed on said other side;

said first and second electrode guide means being mounted on said first and second wheeled carriages, respectively;

said forward traction means being mounted on said second wheeled carriage and said backward traction means being mounted on said first wheeled carriage, said forward and backward traction means generating in the traveling electrode a tension which acts on said wheels of the first and second carriages to force them against said first and second surfaces, respectively, thereby intensifying their frictional engagement therewith; and first and second drive means mounted on said first and second carriages, respectively, for rotationally driving their respective sets of wheels in intensified frictional engagement with said surfaces so that said first and second carriages accurately roll over said first and second surfaces, respectively, so as to allow said straight-line path to effectively move, following a programmed movement trajectory, relative to the workpiece to advance electroerosion along said trajectory in the workpiece.

4. The apparatus recited in claim 3, wherein said first and second surfaces are constituted by two opposite surfaces of the workpiece, respectively.

* * * * *